Patented June 17, 1941

2,245,566

UNITED STATES PATENT OFFICE 2,245,566

WELDING ROD

John W. Bolton, Hamilton, Ohio, assignor to The Lunkenheimer Company, Cincinnati, Ohio, a corporation of Ohio No Drawing. Application February 2, 1940, Serial No. 317,005

6 Claims. (Cl. 219—8)

It is the object of my invention to provide welding rods that will produce a hard, corrosion resistant, wear resistant alloy coating applied by welding.

It is a further object to provide through such a welding rod an alloy that will produce a weld of the foregoing characteristics.

It is a further object to provide a welding rod capable of producing welds that are hard, corrosion resistant and wear resistant and which, after age hardening heat treatment will have the hardness thereof increased materially.

It is an object to provide a welding rod that will leave a welded deposit of from 500 to 600 Brinell hardness of a corrosion resistant metal and which can be deposited over large areas without cracking, either as deposited or after grinding.

It is a further object to provide such a weld that by age hardening heat treatment can be hardened to approximately 650 Brinell.

It is an an object to provide such a weld of this hardness that is not excessively fragile or brittle.

It is a further object to provide a ternary alloy metal welding rod of the composition of nickel, chromium and silicon in the approximate proportions of 6% to 12% silicon, 9% to 30% chromium, and the balance nickel.

Stated another way, the ratio of nickel to chromium should not be more than 10 to 1 and not less than 2 to 1. A ratio of nickel to chromium in the approximate ratio of 4 parts of nickel to 1 part of chromium with silicon added within the approximate range of 6% to 12% produces a satisfactory alloy.

The greater the amount of silicon, the higher the range of hardness. For instance, with silicon at 6% the Brinell number is 470, while, if the silicon is increased to 10%, the Brinell number rises to 601.

We have found that excellent commercial casting has such typical proportions at 71.8% nickel, 17.9% chromium and 10% silicon.

The alloy of my invention is cast into thin sections such as welding rods, preferably by the use of a gas fired crucible which confers upon the alloy an unusual fluidity. After casting, these rods are air quenched. The hardness of the as-cast rod and the welding deposit therefrom is approximately 500 Brinell. After it is deposited the welding layer can be heat treated to increase the hardness to from 600 to 650 Brinell. This age hardening heat treatment is usually within a temperature range of from 900° F. to 1100° F., for a period of from four to sixteen or more hours as may be desired.

The welding rod of this invention is a cellular eutectic structure in a solid solution matrix. The alloy is relatively cheap and produces a hard, wear resistant weld that is not brittle or fragile and which has the valuable property of being capable of being readily cast in rods and other similar long, thin sections.

This welding rod can be utilized for giving a hard, corrosion resistant surface to metal members, thereby making it possible to utilize large bodies of structural metal of cheap character that are not corrosion resistant and are not hard by coating them with the material of this alloy or this welding rod.

It will be understood that I desire to comprehend within my invention such modifications as come within the scope of the claims and the invention.

Having thus fully described my invention, what I claim as new and desire to secure by Letters Patent is:

1. A new article of manufacture for use as a welding rod to produce a hard, corrosion resistant and wear resistant weld or coating comprising an alloy of 6% to 12% silicon, 9% to 30% chromium, and the balance nickel.

2. A new article of manufacture comprising a welding rod of nickel, chromium and silicon in the proportions of 6% to 12% silicon, 9% to 30% chromium, and the balance nickel, and further characterized by the fact that said welding rod when applied as a welded material to other supporting metal can have said coating increased in hardness by age hardening heat treatment.

3. A new article of manufacture comprising a cast ternary alloy welding rod of nickel, chromium and silicon, said silicon being in proportion of 6% to 12%, said chromium in the proportion of 9% to 30%, and the balance nickel.

4. A new article of manufacture to produce a hard, corrosion resistant and wear resistant metallic part comprising an alloy of 6% to 12% silicon, 9% to 30% chromium, and the balance nickel.

5. A new article of manufacture comprising a cast ternary alloy of nickel, chromium and silicon, said silicon being in the proportion of 6% to 12%, said chromium in the proportion of 9% to 30%, and the balance nickel.

6. An article made from an alloy and suitable for use as a welding rod, valve seating materials, and other metallic parts and capable of withstanding severe surface conditions of temperature, pressure and corrosion, comprising a cast ternary alloy of nickel, chromium and silicon, said silicon being in the proportion of 6% to 12%, said chromium in the proportion of 9% to 30%, and the balance nickel.

JOHN W. BOLTON.